United States Patent

Staats

[11] Patent Number: 5,930,480
[45] Date of Patent: *Jul. 27, 1999

[54] SOFTWARE ARCHITECTURE FOR CONTROLLING DATA STREAMS BASED ON LINKED COMMAND BLOCKS

[75] Inventor: Erik P. Staats, Brookdale, Calif.

[73] Assignee: Apple Computer, Inc., Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/731,173

[22] Filed: Oct. 10, 1996

[51] Int. Cl.⁶ ........................................................ G06F 17/00
[52] U.S. Cl. ............................... 395/200.74; 345/200.43
[58] Field of Search ........................... 364/200; 395/200, 395/275, 300, 400, 700, 200.1, 844, 200.68, 200.74, 200.43

[56] References Cited

U.S. PATENT DOCUMENTS

| | | | |
|---|---|---|---|
| 4,149,243 | 4/1979 | Wallis | 364/200 |
| 4,787,035 | 11/1988 | Bourne | 395/300 |
| 5,251,303 | 10/1993 | Fogg et al. | 395/275 |
| 5,301,287 | 4/1994 | Herrell et al. | 395/400 |
| 5,367,685 | 11/1994 | Gosling | 395/700 |
| 5,434,976 | 7/1995 | Tan et al. | 395/200 |
| 5,619,646 | 4/1997 | Hoch et al. | 395/200.1 |
| 5,644,784 | 7/1997 | Peek | 395/844 |

OTHER PUBLICATIONS

Haugdahl, J. Scott, The token ring solution, PC Tech Journal, V5, n1. p. 50, Jan. 1987.

Knuth, D., The Art of Computer Programming, Addison Wesley Longman, p. 234, 1997.

Websters II New Riverside University Dictionary, Houghton Mifflin, p. 646, 1994.

A DSP Architectural Design for Low Bit-Rate Motion Video Codec, IEEE Transactions on Circuits and Systems vol. 36, No. 10, Oct. 1989.

Papamichalis et al., The TMS320C30 Floating-Point Digital Signal Processor, IEEE Micro, Dec. 1988.

Cooper, D., Standard Pascal User Reference Manual, W. W. Norton, p. 137, 1983.

Kernighan et al, Software Tools in Pascal, Whitesmiths Ltd., pp. 276-277, 1981.

Wels et al., Structures System Programming, Prentice-Hall, pp. 22-23, 1980.

Witrth, N., Algorithms+data Structures=programs. Prentice-Hall, p. 174, 1976.

*Primary Examiner*—Ellis B. Ramirez
*Attorney, Agent, or Firm*—Blakely, Sokoloff, Taylor & Zafman

[57] ABSTRACT

A series of data stream commands are combined into a nil terminated linked list to form a data stream control procedure for a computer system. Thereafter, the data stream control procedure is assigned to a data stream within the computer system. A plurality of data items (e.g., packets) associated with the data stream are then managed by executing operations on the data items according to the data stream control procedure. The management operations may include compiling the data stream control procedure into direct memory access (DMA) commands and then executing the DMA commands by transferring the data items within a memory system associated with the computer system. The data stream commands in the data stream control procedure are compiled in a linear sequence. In one embodiment, the computer system may conform to the IEEE 1394 Serial Bus Standard.

17 Claims, 8 Drawing Sheets

LINKED LIST PROGRAM

COMPILED LINKED LIST PROGRAM

LINKED LIST PROGRAM

DCL PROGRAM

SOFTWARE ARCHITECTURE FOR CONTROLLING DATA STREAMS BASED ON LINKED COMMAND BLOCKS

FIELD OF THE INVENTION

This invention relates generally to data communications and, more particularly, to a method and apparatus for controlling data communications within a computer system having a bus architecture.

BACKGROUND

The components of a computer system are typically coupled to a common bus for communicating information to one another. Various bus architectures are known in the prior art, and each bus architecture operates according to a communications protocol that defines the manner in which data transfer between components is accomplished.

The Institute of Electrical and Electronic Engineers (IEEE) has promulgated a number of different bus architecture standards including IEEE standards document 1394, entitled Standard for a High Performance Serial Bus (hereinafter "IEEE 1394 Serial Bus Standard"). A typical serial bus having the IEEE 1394 standard architecture is comprised of a multiplicity of nodes that are interconnected via point-to-point links, such as cables, that each connect a single node of the serial bus to another node of the serial bus. Data packets are propagated throughout the serial bus using a number of point-to-point transactions, wherein a node that receives a packet from another node via a first point-to-point link retransmits the received packet via other point-to-point links. A tree network configuration and associated packet handling protocol ensures that each node receives every packet once. The serial bus of the IEEE 1394 Serial Bus Standard may be used as an alternate bus for the parallel backplane of a computer system, as a low cost peripheral bus, or as a bus bridge between architecturally compatible buses.

A communications protocol of the IEEE 1394 Serial Bus Standard specifies two primary types of bus access: asynchronous access and isochronous access. Asynchronous access may be either "fair" or "cycle master". Cycle master access is used by nodes that need the next available opportunity to transfer data. Isochronous access is used by nodes that require guaranteed bandwidth, for example, nodes transmitting video data. The transactions for each type of bus access are comprised of at least one "subaction", wherein a subaction is a complete one-way transfer operation.

In the case of data transfers within computer systems conforming to the IEEE 1394 Serial Bus Standard, the prior art has attempted to manage the flow of data using dedicated drivers. Drivers are software entities associated with various components of a computer system and, among other functions, operate to configure the components and allow the components to be operable within the overall system. The drivers of the prior art have allowed for the control of data streams (i.e., data transfers between components of the computer system) using linked lists of buffer descriptors. However, such linked list approaches often suffer from disadvantages. For example, in cases where looping and/or branching is required, linked lists present compilation problems because a compiler is forced to keep track of all previously compiled instructions and instruction paths.

In addition, some prior art approaches to the control of data streams offer little or no flexibility. For example, some drivers provide only a single, fixed buffer structure which may be ill suited for use in situations where variable length data packets are commonly found within the data stream being controlled. It would, therefore, be desirable to have a means and method for a more efficient, flexible and dynamic control of data streams in a computer system.

SUMMARY OF THE INVENTION

A method of controlling data streams in a computer system is described. In one embodiment, the computer system may conform to the IEEE 1394 Serial Bus Standard. A series of data stream commands are combined into a nil terminated linked list to form a data stream control procedure. Thereafter, the data stream control procedure is assigned to a data stream within the computer system. A plurality of data items (e.g., packets) associated with the data stream are then managed by executing operations on the data items according to the data stream control procedure. The management operations may include compiling the data stream control procedure into direct memory access (DMA) commands and then executing the DMA commands by transferring the data items within a memory system associated with the computer system. The data stream commands in the data stream control procedure are compiled in a linear sequence.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
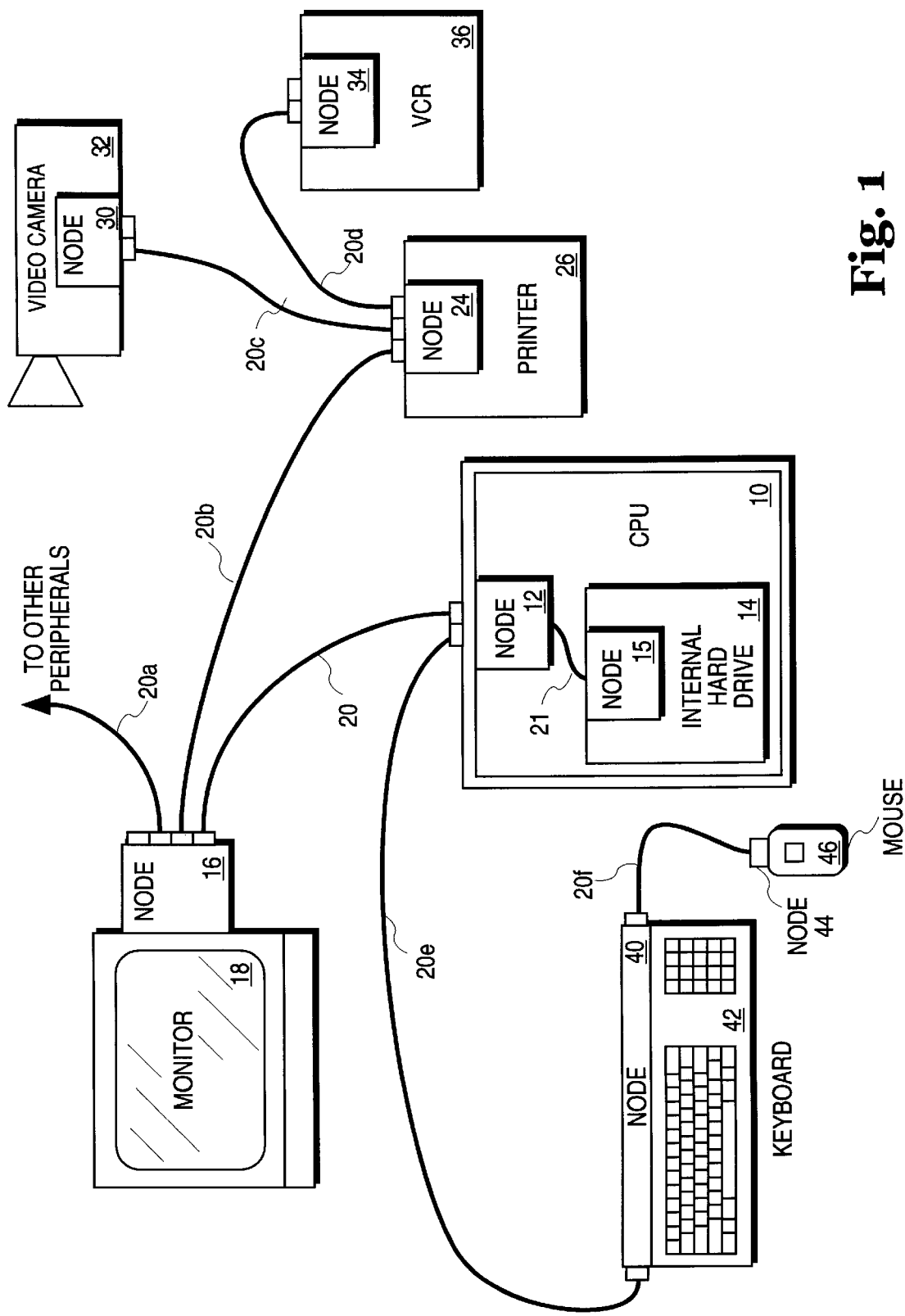
FIG. 1 illustrates a computer system having a serial bus made up of a number of nodes.

As described herein, a method and apparatus for controlling data streams in a computer system is provided. FIG. 1 shows a computer system 5 utilizing a serial bus incorporating the methods and apparatus of the present invention. The serial bus may generally be constructed in accordance with the IEEE 1394 Serial Bus Standard.

Some portions of the detailed description which follows are presented in terms of data structures, algorithms and symbolic representations of operations on data within a computer memory. These descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The computer system 5 of FIG. 1 comprises a central processing unit (CPU) 10, a monitor 18, a printer 26, a video camera 32, a video cassette recorder (VCR) 36, a keyboard 42, and a mouse 46. The CPU 10 includes an internal hard drive 14 and a memory (not shown). Each of the devices of the computer system is coupled to a local node of the serial bus. In general, the device to which a node is coupled acts as the "local host" for that node. For example, the CPU 10 is the local host for the CPU node 12; the monitor 18 is the local host for the monitor node 16; the printer 26 is the local host for the printer node 24; the video camera 32 is the local host for the video camera node 30; the VCR 36 is the local host for the VCR node 34; the keyboard 42 is the local host for the keyboard node 40; the mouse 46 is the local host for the mouse node 44; and the internal hard drive 14 is the local host for the internal hard drive node 15. Those skilled in the art will appreciate that it is not always necessary for every node to have a local host, nor is it necessary that the local host always be powered.

A point-to-point link such as cable 20 is used to connect two nodes to one another. CPU node 12 is coupled to internal hard drive node 15 by an internal link 21, to monitor node 16 by cable 20, and to keyboard node 40 by a cable 20e. The keyboard node 40 is coupled to the mouse node 44 by a cable 20f. The monitor node 16 is coupled to the nodes of the other peripherals (not shown) by cable 20a and to the printer node 24 by cable 20b. The printer node 24 is coupled to the video camera node 30 by cable 20c and to the VCR node 34 by cable 20d. Each of the cables 20–20f and the internal link 21 may be constructed in accordance with the IEEE 1394 Serial Bus Standard and may include a first differential signal pair for conducting a first signal, a second differential signal pair for conducting a second signal, and a pair of power lines.

Each of the nodes 12, 15, 16, 24, 32, 34, 40 and 44 may have identical construction, although some of the nodes, such as mouse node 44, can be simplified because of their specific functions. Thus, the nodes can be modified to meet the needs of a particular local host. For example, each node may have one or more ports, the number of which is dependent upon its needs. For example, CPU node 12, as illustrated, has 3 ports, while the mouse node 44 has only 1 port.

Figure 2:
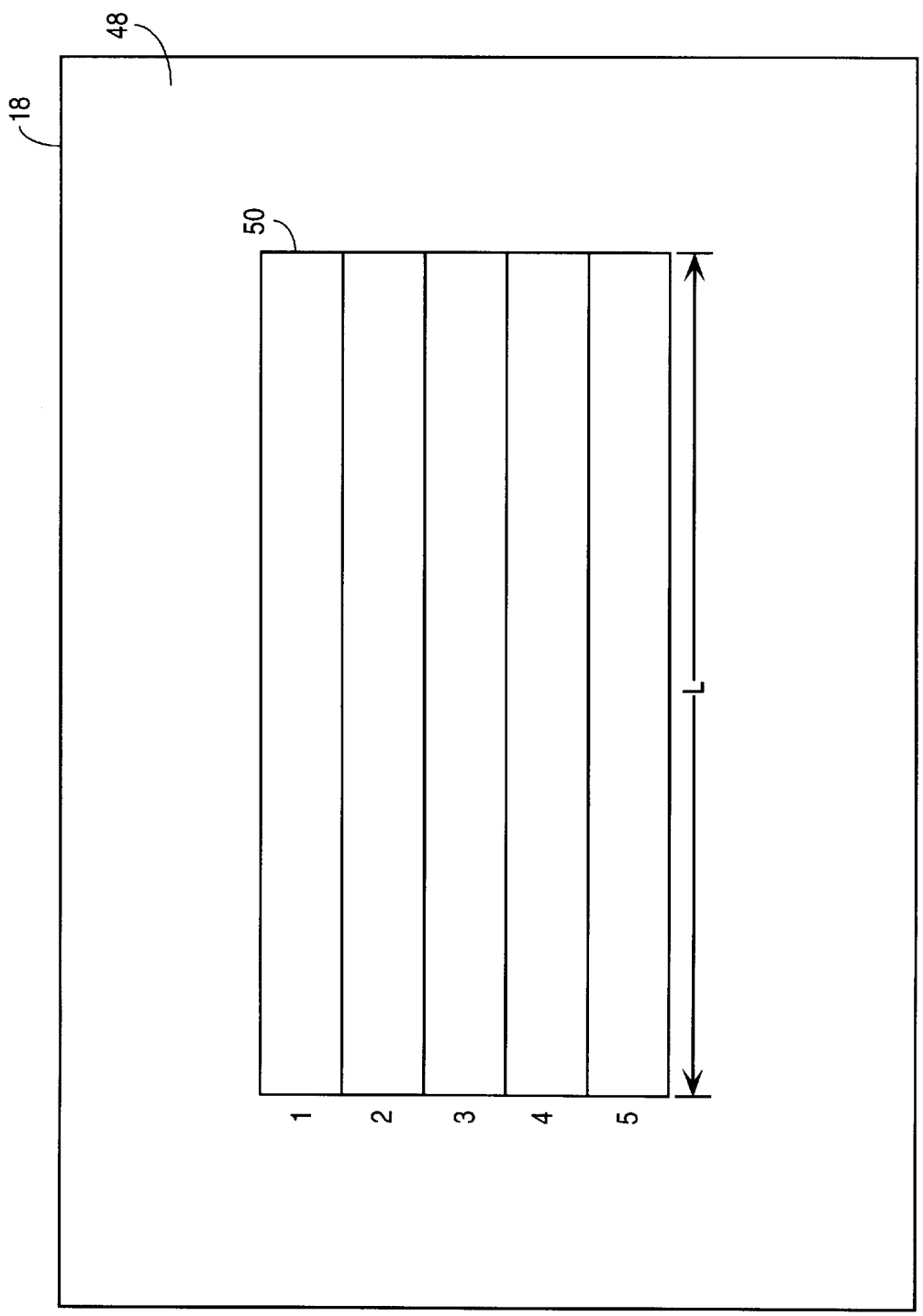
FIG. 2 shows a display screen of a monitor of a computer system having an open window for the display of video information.

Referring now to FIG. 2, one example of the transfer of data items associated with a data stream within computer system 5 will be described. Upon review of the entire specification, those skilled in the art will appreciate that this example is used to describe the methods of the present invention including some of the advantages achieved over the prior art and is only one of many applications of the data stream command language described below. FIG. 2 shows the display screen of monitor 18. Within display screen 48, a window 50 is shown. Window 50 is implemented using programming techniques well known in the art and is used for the display of real-time video data. In particular, window 50 defines the boundary within which the real-time video data will be displayed on display screen 48. As shown in FIG. 2, window 50 consists of five scan lines, each having an arbitrary length L. Those skilled in the art will appreciate that window sizes of other dimensions could be used.

In general, window 50 will be generated by an application program running on computer system 5. An example of such an application program is the QuickTime® program available from Apple Computer, Inc. of Cupertino, Calif. In such a case, computer system 5 may comprise the familiar Macintosh® computer system also available from Apple Computer, Inc. The application program will typically be running within an environment provided by an operating system, such as the MacOS®, also running on computer system 5. The video data to be displayed in window 50 on display screen 48 will generally be obtained from a frame buffer (not shown) associated with monitor 18. The techniques for displaying data stored in a frame buffer on the display screen of a monitor are well known in the art.

In accordance with the methods of the present invention, real-time video data from video camera 32 is to be displayed within window 50 on display screen 48. The real-time video data generated by video camera 32 will comprise isochronous data packets in accordance with the IEEE 1394 Serial Bus Standard. Each of these isochronous data packets will include header information and payload information. The header information is used for routing the video data to the monitor 18 and for error detection and correction. The payload data comprises the video data to be displayed within window 50.

Figure 3:
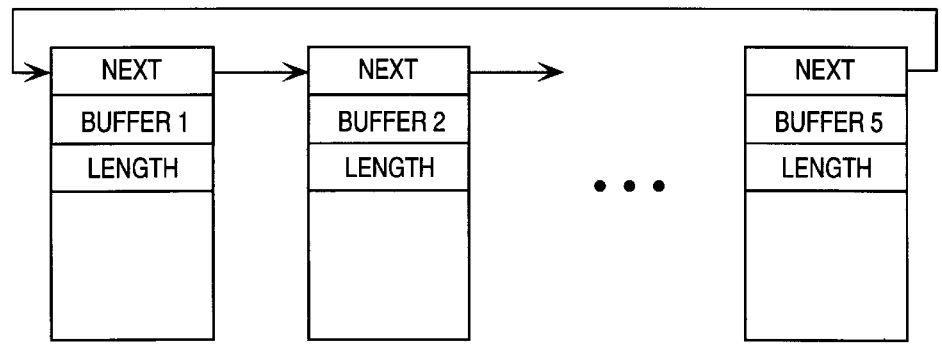
FIG. 3 shows a linked list of buffers in accordance with one embodiment.

As indicated above, some attempts to manage this flow of data (i.e., the data stream) from video camera 32 to monitor 18 use linked lists of buffer descriptors. FIG. 3 shows a linked list of buffers which reside in computer memory. In keeping with the above described example, five buffers comprise the linked list, one for each scan line of window 50. Each of the buffers contains a pointer, next, which points to the address of the following buffer in the linked list. It will be appreciated that these addresses correspond to memory locations within computer system 5. Each of the buffers also contains an address "buffer n". This address corresponds to the start of a scan line of window 50. The address of buffer 1 corresponds to the start of scan line 1 and so on. Each of the buffers in the linked list also contains a length parameter which corresponds to the scan line length of window 50.

The linked list of buffers corresponds to a particular isochronous channel. The isochronous channel is identified by a channel identification number (channel ID). The channel ID is maintained in a data record stored in the computer system 5 memory and is used by the various application programs and driver routines as described below. The use of a common channel ID allows the interoperation of application programs, driver routines, and other software routines which otherwise may not be capable of operating together.

To accommodate the transmission of the real-time video (i.e., isochronous) data, an application program running on computer system 5 issues instructions which cause CPU 10 to create an isochronous data channel identified by "channel ID". Upon receiving the instruction to create the isochronous channel ID, the CPU 10 will execute instructions to create such a channel. This may include a channel bandwidth and a preferred speed.

Once a channel has been established, the application program can issue instructions in order to add interested clients to the isochronous channel specified by channelID. These clients are typically software driver routines associated with the devices, such as video camera 32, which take part in the display of the real-time video data to be transferred. The client software will take part in and be notified of all events associated with the given isochronous channel specified by the channel ID. Accordingly, the application program instructs the driver associated with video camera 32 to send real-time video data over the channel identified by "channelID" and display the data within window 50 on monitor 18.

In response to the instructions issued by the application program, the camera driver will configure the camera 32 such that the camera 32 will transmit video data over the channel specified by "channelID". The camera driver will also establish a linked list of buffers, as described above, and assign the buffers to "channelID". The linked list of buffers will act as storage locations for the video data to be transmitted by camera 32.

Where a user also wishes to record video data transmitted by camera 32 for a later playback, the application program issues instructions to establish the VCR driver as a receiver client of the channel specified by "channelID". In response, the VCR driver adds itself as a channel client. Once all of the clients have been added to the isochronous channel specified by channel ID, a start instruction can be issued. Each listening client is first instructed to listen to the channel. Once all of the listeners are ready, the sender client is instructed to start the transmission of data.

At this point, CPU 10 may continue with other instructions. For example, CPU 10 may respond to menu level instructions initiated by a user or execute commands for a selected foreground application. When video camera 32 transmits data on the isochronous channel specified by a channel ID, the CPU receiving the data generates an interrupt. The interrupt is recognized and CPU 10 executes instructions which transfer the incoming isochronous data into an appropriate buffer within the linked list. The CPU 10 then returns from the interrupt to complete or continue with any tasks. Alternatively, a direct memory access (DMA) transfer is initiated to transfer the data without interrupting the CPU 10. Subsequently, data is transferred from the buffers which comprise the linked list to a frame buffer associated with monitor 18 for eventual display on display screen 48 within window 50. This process continues until an isochronous channel stop instruction is issued.

Figure 4:
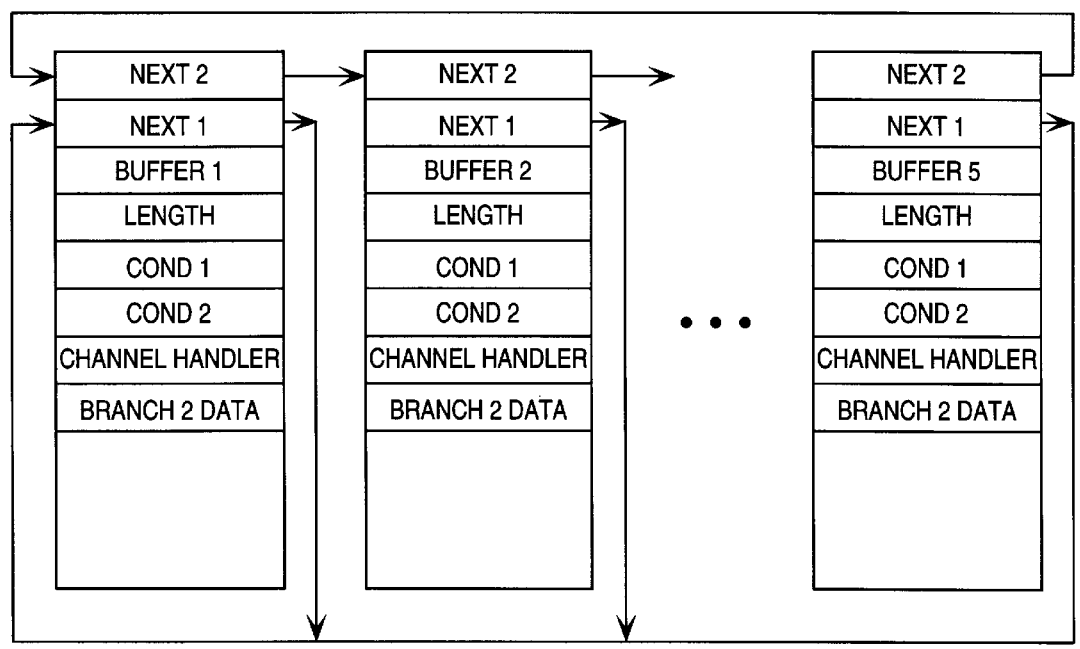
FIG. 4 shows a linked list of buffers which support conditional branching according to one embodiment.

Those skilled in the art will recognize that more complex linked list configurations, for example as shown in FIG. 4, may be used to support conditional branching. That is, the linked list may contain pointers which do not necessarily correspond to the succeeding buffer in the chain. Instead, the linked list supports pointers (next1) which point back to the first address of the first buffer in the linked list (or, potentially, any other buffer, as desired and depending upon the branch condition described below). Associated with the pointer next1 is a data field, cond1. The data field, cond1, may, for example, correspond to a top-of-frame indication. Thus, when real-time video data is received over the isochronous channel, if the data indicates that it is meant for the top-of-frame in window 50, the linked list will point to the starting address of the buffer associated with scan line 1. In this way, top-of-frame data will always be displayed at the top of window 50.

Where the video data received does not have a top-of-frame indication, the linked list will point to the next buffer in the chain. Those skilled in the art will appreciate that other branching conditions, such as branch on fill or branch on sync, can also be implemented.

The linked list approaches of controlling data streams illustrated in FIGS. 3 and 4 present certain problems to a compiler when the linked list commands are compiled into DMA commands for execution by DMA devices associated with the nodes of computer system 5. For example, the linked list approach illustrated in FIG. 3 presents a first order problem in that a loop is required. A compiler will typically compile the commands in the linked list in the same order as the commands would be executed. As a result, the compiler will be forced to keep track of all previously compiled commands so that when the loop command is compiled, the instructions from the first buffer structure in the linked list are not compiled a second time, and so on. The scheme illustrated in FIG. 4 not only presents this same problem, it adds a second order problem of conditional branching. Now any parsing algorithm used during compilation will be very complicated because the compiler must keep track of all the conditional branch paths available and which paths have already been compiled.

To overcome problems such as these, a data stream command language is provided. The data stream command language (DCL) is, in one embodiment, a set of commands that control data flow into or out of a data stream, such as the data stream between camera 32 and monitor 18 discussed above. A collection of DCL commands are connected together into a linked list to form a DCL program which can be assigned to a particular data stream such as a data stream associated with an isochronous channel. As will be described in further detail below, the default execution order of a DCL program is to start with the first DCL command in the program and to follow the DCL command links. This execution order may be changed (e.g., for a loop) by using DCL jump commands. The linked list of DCL commands is nil terminated to indicate the end of the DCL program. The nil termination allows for ease of compilation because the compiler need only compile the DCL commands in a linear sequence. When the compiler reaches the nil command, all instructions will have been compiled, without further need to account for any looping or branching. Accordingly, the problems of the above-described linked list approaches are avoided.

The DCL is simple, extensible and, as indicated, compilable into DMA programs. DCL programs will typically be created by drivers and will be compiled by software interface modules associated with particular components of computer system 5 into DMA programs. More complex DCL commands may be directly supported by some DMA architectures or may be translated into simpler DCL commands by a software service routine associated with an operating system running on computer system 5. Thus, an interface module need not be able to compile all DCL commands. Instead, interface modules need only support a core set of basic DCL commands as described below.

Figure 5:
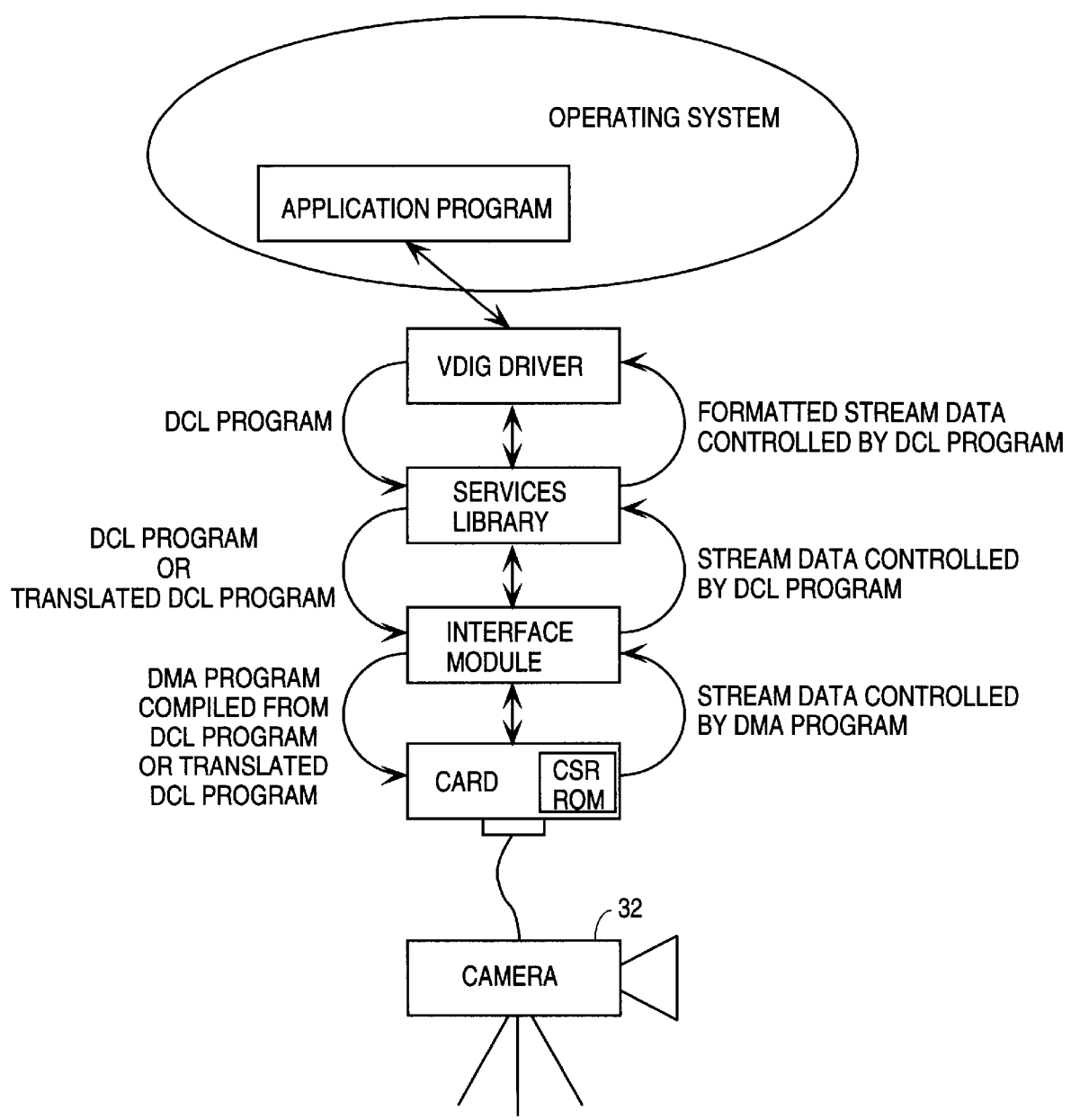
FIG. 5 shows an exemplary software architecture supporting a Data Stream Command Language (DCL) according to one embodiment.

FIG. 5 illustrates a software architecture supporting the DCL. A video digitizer driver (VDig) may be associated with video camera 32 and called by an application program, such as the QuickTime® program described above, running on computer system 5. The application program provides a user interface which allows a user to control the actions of camera 32. The VDig driver utilizes DCL services provided by a services library to develop a DCL program to control data streams which contain data elements. The data elements may be in the form of packets and may contain headers and payloads as described in the IEEE 1394 Serial Bus Standard. The DCL program is compiled into a DMA program by an interface module associated with a card or other network adapter which is coupled to camera 32. It will be appreciated that the card or other network adapter performs the functions of node 30, illustrated in FIG. 1. The card includes DMA devices which operate under the control of the DMA program compiled from the DCL program to transfer the data items in the data stream within a memory system associated with computer system 5. The memory system may be resident on the card or, more likely, within CPU 10 (e.g., a random access memory used by CPU 10).

The DCL program generated by the VDig driver will consist of a nil terminated linked list of DCL commands. At least a minimum set of commands are provided to control the data stream. For example, a DCLSendPacketStartOp command is used to specify the first part of a packet to be sent to a data stream (e.g., from a buffer associated with camera 32). Subsequent parts of a packet may be specified using a DCLSendPacketOp command. A packet is defined as a contiguous string of DCL packet commands that start with a DCL packet start command and end with any DCL command that is not a DCL packet command. Thus, scatter/gather lists may be used in constructing packets. To determine the total size of a packet, a DCL compiler (e.g., an interface module) may sum respective size fields in any DCL packet start and packet commands defining the packet of interest. DCL send packet buffers need not include a packet header. Instead, a packet header will be constructed by the compiler, based upon the channel number for the data stream associated with the DCL program, any tag and sync bits specified by a DCLSetPacketAttributes command (see below) and the computed length of the packet.

An exemplary DCLCommand, e.g., DCLSendPacketStartOp or DCLSendPacketOp, may have the following structure.

```
struct DCLCommandStruct
{
DCLCommandPtr          pNextDCLCommand;
UInt32                 compilerData;
UInt32                 opcode;
UInt32                 operands;
};
typedef struct DCLCommandStruct  DCLCommand
                                 *DCLCommandPtr;
  pNextDCLCommand        Link to next DCL command in
                         program.
  compilerData           DCL compiler's private data.
  opcode                 Opcode specifying type of DCL
                         command.
  operands               Operands of DCL command.
```

The DCLSendPacketStartOp and DCLSendPacketOp commands use a DCLTransferPacket record to indicate buffers to be used during the transfer of data items. An exemplary DCLTransferPacket record may have the following structure.

```
struct DCLTransferPacketStruct
{
  DCLCommandPtr          pNextDCLCommand;
  UInt32                 compilerData;
  UInt32                 opcode;
  Ptr                    buffer;
  UInt32                 size;
};
typedef struct DCLTransferPacketStruct  DCLTransferPacket
                                        *DCLTansferPacketPtr;
  pNextDCLCommand        Link to next DCL command in
                         program.
  compilerData           DCL compiler's private data.
  opcode                 Opcode specifying type of DCL
                         command.
  buffer                 Pointer to buffer to send/receive
                         packet from/into.
  size                   Size of data to send/receive.
```

Another of the minimum set of DCL commands is a DCLReceivePacketStartOp. This command has the structure described above and is used to specify the first part of a scattered buffer to receive data from a data stream. It uses a DCLTransferPacket record to indicate the buffer data is to be transferred into. If the packet received from the data stream is larger than the total buffer size for all the DCL packet start and packet commands for the packet, the end of the packet data will be lost. If the packet received from the data stream is smaller than the total buffer size, the additional buffer space will not be written to, and the next packet received will be placed in the next packet buffer that starts with the next DCL packet start command. The packet header is included as the first quadlet of data in the packet.

A DCLReceivePacketOp command may be used to specify part of a scattered buffer to receive data from a data stream. The command will follow a DCLReceivePacketStartOp and will use the DCLTransferPacket record.

Although not part of the minimum set of DCL commands, a DCLReceiveBufferOp may be used to specify a buffer to receive continuous data from a data stream. This command also uses the DCLTransferPacket record to specify the buffer being used. This command is different from the DCLReceivePacketStartOp and DCLReceivePacketOp commands in that it concatenates received packets into one buffer. Received packets are written into a DCLReceiveBufferOp buffer until the buffer is filled.

If only part of a packet fits into the remaining amount of buffer space, the rest of the packet will be placed into the next DCLReceiveBufferOp buffer if there is one. Otherwise, the rest of the packet data will be lost. If the next DCL receive command is a packet receive command, the rest of the packet (i.e., that portion which did not fit in the DCLReceiveBufferOp buffer) will be lost. However, if non-DCL transfer commands (e.g., a DCL call procedure command, see below) come between two DCLReceiveBufferOp commands, the remaining packet data will not be lost and will be placed in the next DCLReceiveBufferOp buffer.

As indicated, there are some non-data transfer commands contained within the minimum set of DCL commands. One such command is a DCLCallProc command. This command is typically used by a driver (e.g., the VDig driver in the above example) so that the driver will be notified when a DCL program has reached a certain location. It is useful when a driver must regularly update buffers being used to send data items to a data stream. A typical DCLCallProc command may use the following DCLCallProc record.

```
struct DCLCallProcStruct
{
    DCLCommandPtr          pNextDCLCommand;
    UInt32                 compilerData;
    UInt32                 opcode;
    DCLCallCommandProcPtr  proc;
    UInt32                 procData;
};
typedef struct DCLCallProcStruct  DCLCallProc
                                  *DCLCallProcPtr;
    pNextDCLCommand        Link to next DCL command in
                           program.
    compilerData           DCL compiler's private data.
    opcode                 Opcode specifying type of DCL
                           command.
    proc                   Pointer to proc to be called.
    procData               Proc's private data.
```

The specified proc (i.e., procedure) is called and passed a pointer to the DCLCallProc record. The procData field is typically set and used by the driver that created the DCL program and is not used by the DCL compiler.

Another non-data transfer command for the minimum set of DCL commands is a DCLSetPacketAttributesOp. This command is used to set packet attributes such as the sync and tag bits for a packet being sent into a data stream. This command may use a DCLSetPacketAttributes record as shown below.

```
struct DCLSetPacketAttributesStruct
{
    DCLCommandPtr          pNextDCLCommand;
    UInt32                 compilerData;
    UInt32                 opcode;
    UInt32                 attributesType;
    UInt32                 attributesMask;
    UInt32                 attributes;
};
typedef struct                     DCLSetPacketAttributes
DCLSetPacketAttributesStruct
                                   *DCLSetPacketAttributesPtr;
    pNextDCLCommand        Link to next DCL command in
                           program.
    compilerData           DCL compiler's private data.
    opcode                 Opeode specifying type of DCL
                           command.
    attributesType         Type of attributes being specified.
    attributesMask         Mask of which attributes are being
                           specified.
    attributes             Attributes being specified.
```

The DCL Set Packet Attributes Op sets the attributes for all subsequent packets following the DCL program command links (but not DCL jump command links, see below) until the next DCLSetPacketAttributesOp command. The attributesType field specifies what type of attributes are being set. For example, this may be isochronous attributes or asynchronous attributes, depending on the type of data stream being sent. The attributesMask field indicates which attributes specified in the attributes field are relevant. For example, for isochronous data, sync bits may be specified in bit positions 28–31 and tag bits may be specified in bit positions 16 and 17.

A further one of the minimum set of DCL commands is the DCLLabelOp. This command is used to specify a location in a DCL program that may be jumped to. Some DMA architectures (e.g., those that support a program command language PCL structure) require that an interface module know all the locations in a DCL program that may be jumped or branched to. The DCLLabelOp provides such a capability.

Figure 6A:
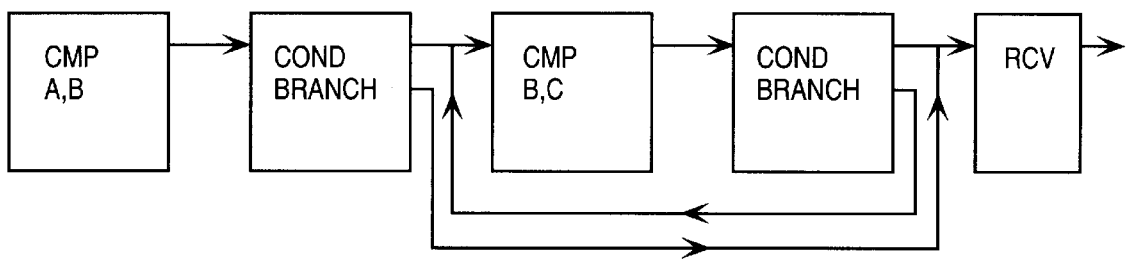
FIG. 6A illustrates some difficulties which may be experienced when a linked list program containing conditional branch operations is compiled into a direct memory access program.
Figure 6A:
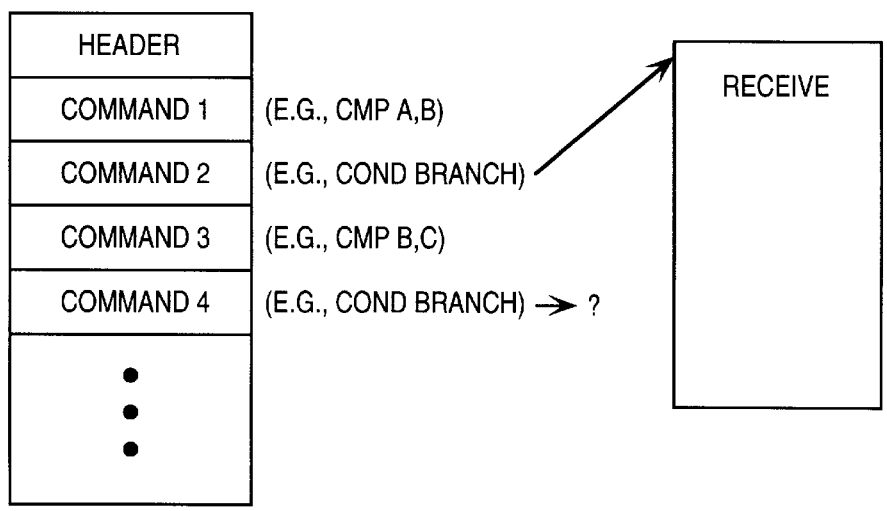

For example, as shown in FIG. 6A, a series of linked list commands may include a series of conditional branch operations. When this set of commands is compiled into a PCL format in which more than one command may be included in each buffer structure, a problem is presented. Specifically, if the second conditional branch operation (following the compare B, C operation) is compiled into the same PCL buffer structure that supports the compare A, B operation, the second conditional branch operation cannot be performed properly. That is, the second conditional branch will end up pointing to the compare A, B instruction and not the compare B, C instruction because there can be no branching into the middle of a PCL buffer structure (where the cmp B, C instruction now resides). To alleviate this problem, the prior art would have to provide a compiler that keeps track of all branching operations in some fashion.

Figure 6B:
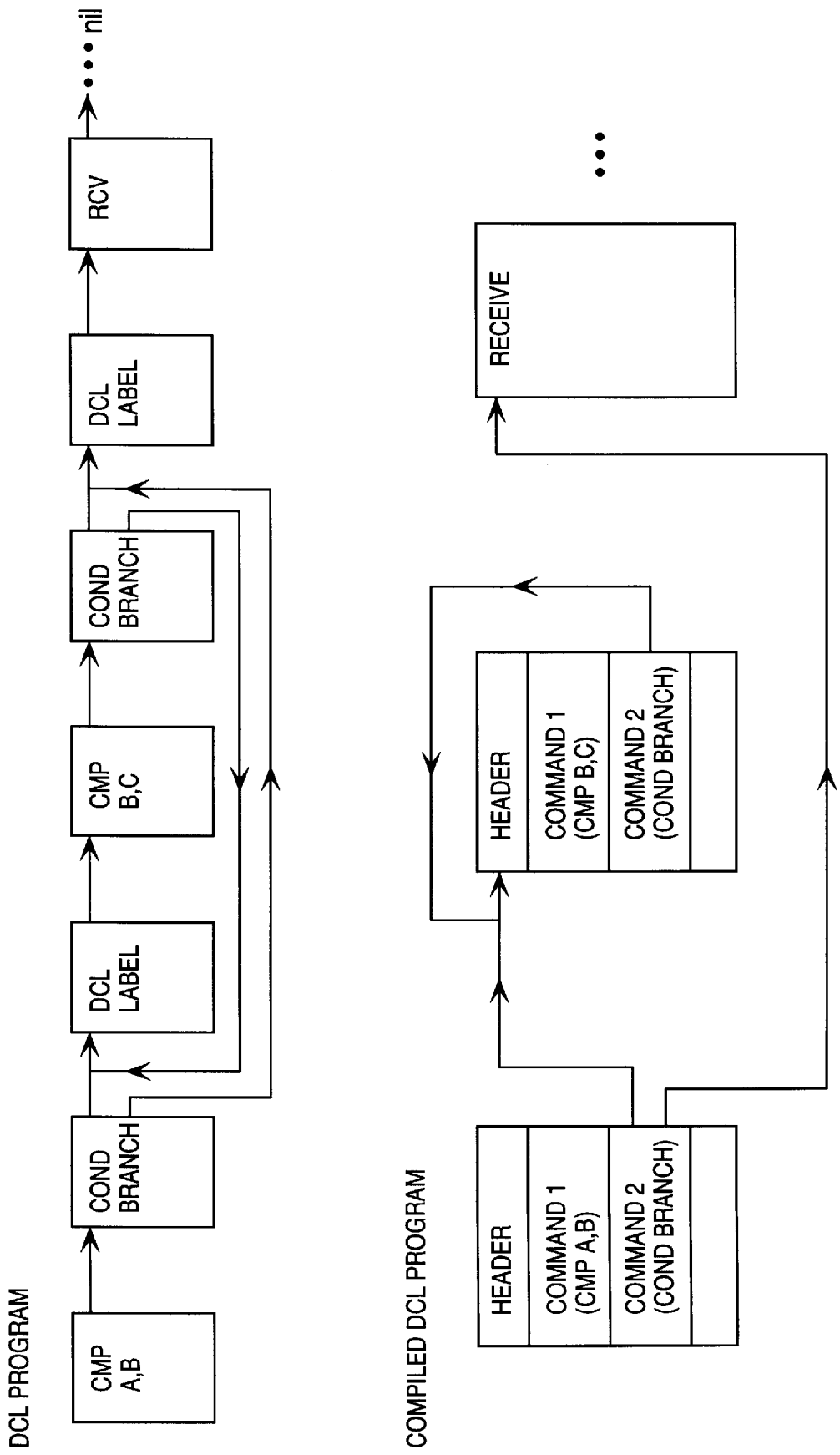
FIG. 6B illustrates how the difficulties presented in the example shown in FIG. 6A are avoided through the use of a DCLLabel command of the Data Stream Command Language according to one embodiment.

In contrast, the use of the DCLLabelOp avoids this problem. As shown in FIG. 6B, a DCL program has the same compare and branch operations as the linked list scheme of FIG. 6A. However, the DCL program is nil terminated and also includes two Label operations, one following each conditional branch instruction. The label operations are essentially no-ops, however, they are inserted because the driver which creates the DCL program recognizes that each instruction following a conditional branch instruction represents a possible point of entry for another instruction. Accordingly, the Label operations act as "book marks" for such locations in the program and the DCL program can be compiled such that when a Label instruction is recognized, it signals the compiler to begin a new PCL buffer structure for the next instruction. In this way, all of the branching operations are properly compiled.

The DCLLabelOp may use the following record.

```
struct DCLLabelStruct
{
    DCLCommandPtr          pNextDCLCommand;
    UInt32                 compilerData;
    UInt32                 opcode;
};
typedef struct DCLLabelStruct      DCLLabel
                                   *DCLLabelPtr;
    pNextDCLCommand        Link to next DCL command in
                           program.
    compilerData           DCL compiler's private data.
    opcode                 Opcode specifying type of DCL
                           command.
```

Figure 7:
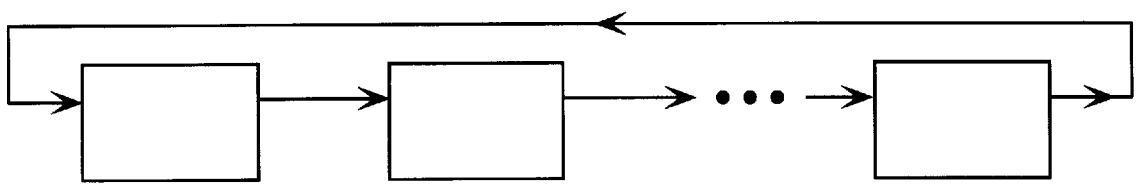
FIG. 7 illustrates how compilation problems presented by a linked list program containing a loop operation are avoided using a nil terminated linked list approach and DCLJump command of the Data Stream Command Language according to one embodiment.
Figure 7:
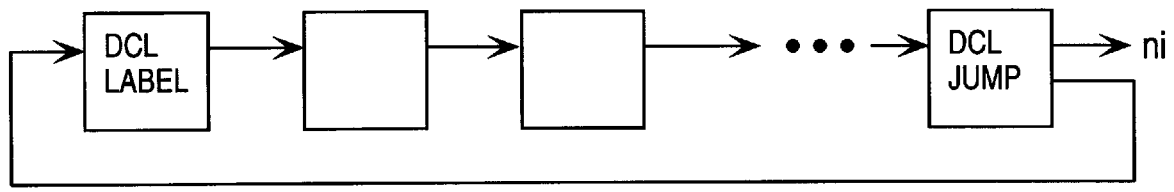

The final one of the minimum set of DCL commands is the DCLJumpOp. This command is used to change the default order of a DCL program. In particular, the DCLJumpOP command may be used by a driver to create a looping DCL program, as shown in FIG. 7. The top illustration in FIG. 7 shows a loop program such as may be found in a linked list scheme of the prior art (see, e.g., FIG. 3). This type of program presents the compilation problem discussed in detail above. In contrast, the DCL program shown in the bottom illustration of FIG. 7 includes the DCLJump command which allows for the looping and is also nil terminated to allow for ease of compilation.

The DCLJumpOp command may use the following record.

```
struct DCLJumpStruct
{
    DCLCommandPtr          pNextDCLCommand;
    UInt32                 compilerData;
```

-continued

```
    UInt32              opcode;
    DCLLabelPtr         pJumpDCLLabel;
};
typedef struct DCLJumpStruct  DCLJump
                              *DCLJumpPtr;
    pNextDCLCommand     Link to next DCL command in
                        program.
    compilerData        DCL compilerts private data.
    opcode              Opcode specifying type of DCL
                        command.
    pJumpDCLLabel       Pointer to DCL label to jump to.
```

The pJumpDCLLabel field specifies the DCL label command to jump to.

As indicated above, a driver will create a DCL program using a Services Library. For the DCL, several services may be provided. For example, before a DCL program may be constructed, a DCL program identifier must be created to provide a reference to the program. An exemplary routine to return such an identifier is as follows.

```
OSStatus          CreateDCLProgram (
    DCLProgramID             *pDCLProgramID);
<-- pDCLProgramID           Created DCLProgramID.
```

This routine may be called by the driver to create a DCLProgramID (identifier) to reference the DCL program. The returned DCLProgramID will be used in all subsequent DCL calls to reference the DCL program being constructed.

Similarly, when a driver wishes to dispose of a DCL program, it calls a DisposeDCLProgram routine to release the resources allocated by the CreateDCLProgram routine. Such a call may be as follows.

```
OSStatus          DisposeDCLProgram (
    DCLProgramID             dclProgramID);
--> dclProgramID            DCLProgramID to dispose of.
```

The DisposeDCLProgram will not deallocate any of the DCL commands in the program or any of the buffers specified by those commands; such deallocation is the responsibility of the driver.

To indicate the first DCL command of a DCL program, a SetDCLProgramStart routine is provided. An example of such a routine is as follows.

```
OSStatus          SetDCLProgramStart (
    DCLProgramID             dclProgramID;
    DCLCommandPtr            pDCLCommand);
--> dclProgramID            DCLProgramId to set start of.
--> pDCLCommand             First DCL command of
                            program.
```

Additional DCL commands may be linked to the program after SetDCLProgramStart is called but before the program is run.

Because the interface module which is used to compile the DCL program must also know the location of the first command in the program it is to compile, the Services Library provides a GetDCLProgramStart operation.

```
OSStatus          GetDCLProgramStart (
    DCLProgramID             dclProgramID,
    DCLCommandPtr            *ppDCLCommand);
```

```
--> dclProgramID            DCLProgramID to get start
                            of.
<-- ppDCLCommand            First DCL command of
                            program.
```

While compiling a program, the interface module generally requires a means of storing private data. Hence, a SetDCLProgramEngineData operation is provided to set a data field for use by the software running and/or compiling the DCL program.

```
OSStatus          SetDCLProgramEngineData (
    DCLProgramID             dclProgramID,
    UInt32                   dclEngineData);
--> dclProgramID            DCLProgramID to set engine
                            data of.
--> dclEngineData           Data used by DCL program
                            engine.
```

The above call is used, for example, by an interface module while compiling a DCL program to store a pointer to the beginning of a DMA program that it compiled from a DCL program. Alternatively, the interface module might store a pointer to a data structure that contains the start of a DMA program and the DMA channel being used for the DCL program. The engine data will typically be set when the interface module first compiles the DCL program and will later be retrieved when the interface module is instructed to start or stop the DCL program.

To accommodate the above call, a GetDCLProgramEngineData routine is provided.

```
OSStatus          GetDCLProgramEngineData (
    DCLProgramID             dclProgramID,
    UInt32                   *pDCLEngineData);
--> dclProgramID            DCLProgramID to set engine
                            data of.
<-- pDCLEngineData          Data used by DCL program
```

This routine retrieves a 32-bit data field (DCLEngineData) for use by the software running and/or compiling the DCL program.

To set an event for the start of the DCL program, a SetDCLProgramStartEvent routine is provided.

```
OSStatus          SetDCLProgramStartEvent (
    DCLProgramID             dclProgramID,
    UInt32                   startEvent,
    UInt32                   startEventState,
    UInt32                   startEventStateMask);
--> dclProgramID            DCLProgramID to set start
                            event of.
--> startEvent              Type of event to start on.
--> startEventState         State of event to start on.
--> startEventStateMask     Mask of relevant bits in
                            startEventState.
```

Starting events may include an immediate event and/or a cycle event. An immediate event (kImmediateEvent) specifies that the DCL program should start immediately upon starting the data stream associated with the DCL program. This may be used as a default setting. A cycle event (kCycleEvent) specifies that the DCL program should wait until the specified cycle number has occurred. The cycle number to start on is specified in startEventState. The startEventStateMask specifies the relevant bits in the startEventState.

So that an interface module will know what event to start a given DCL program on, a GetDCLProgramStartEvent operation is provided.

```
OSStatus        GetDCLProgramStartEvent (
    DCLProgramID              dclProgramID,
    UInt32                    *pstartEvent,
    UInt32                    *pstartEventstate,
    UInt32                    *pstartEventStateMask);
-->  dclProgramID             DCLProgramID to set start
                              event of.
<--  pstartEvent              Type of event to start on.
<--  pstartEventState         State of event to start on.
<--  pstartEventStateMask     Mask of relevant bits in
                              startEventState.
```

This routine returns the start event information for the specified DCL program.

The Services Library also provides a means to update a DCL program. The SetDCLProgramCompilerNotificationProc sets the routine to call when a DCL program is updated and is typically called by an interface module. If a driver wishes to change a DCL command while a DCL program is running, the compiler must be notified to change the corresponding DMA commands. This may happen, for example, if a driver wishes to change the destination of a DCL jump command by calling DCLModifyJump (see below). The DCLModifyJump routine will call the DCL program's notification routine and pass it the DCL jump command that has been modified. The modification routine then makes any changes necessary to change the target of the jump command. Typically, this will involve changing the destination of a DMA branch command. A sample call is as follows.

```
OSStatus        SetDCLProgramCompilerNotificationProc (
    DCLProgramID                      dclProgramID,
    DCLCompilerNotificationProcPtr    dclCompilerNotificationProc);
-->  dclProgramID                     DCLProgramID to set start
                                      event of.
-->  dclCompilerNotificationProc      Proc to call on DCL program
                                      updates.
```

Because some drivers may support a more complex set of DCL commands than the minimum set described above, a TranslateDCLProgram operation is provided by the Services Library. The TranslateDCLProgram operation translates a DCL program operation with complex DCL commands into a DCL program that only uses the minimum set of commands above. This routine is typical called by an interface module which has been given a DCL program with some DCL commands that the interface module does not directly support. The translated DCL program will be returned in pTranslatedDCLProgramID as follows.

```
OSStatus        TranslateDCLProgram (
    DcLProgramID              dclProgramID,
    DCLProgramID              *pTranslatedDCLProgramID);
-->  dclProgramID             DCLProgramID to set start
                              event of.
<--  pTranslatedDCLProgramID  Returned DCLProgramID of
                              simpler, translated DCL
                              program.
```

As indicated above, a ModifyDCLJump operation is provided to modify a DCL jump command in a DCL program that is currently running. A sample call for this routine is as follows.

```
OSStatus        ModifyDCLJump (
    DCLProgramID              dclProgramID,
    DCLJumpPtr                pDCLJump,
    DCLLabelPtr               pDCLLabel);
-->  dclProgramID             DCLProgramID to set start
                              event of.
-->  pDCLJump                 Pointer to DCL jump
                              command to modify.
-->  pDCLLabel                Pointer to new destination of
                              the DCL jump command.
```

This routine may be called while a DCL program is in progress as illustrated with reference to FIG. 8. Suppose the DCL program shown in FIG. 8 has been created to transfer video data to camera 32, e.g., for recording on a video tape. Ideally, as each frame of data is transmitted from a respective buffer to the camera as part of an associated data stream, the buffer's contents will be updated by the associated driver (e.g., the VDig driver) with a new frame of data. However, to account for situations where buffer underflows may occur (i.e., situations where the new data is not yet ready for transmission because of system delays, etc.), the program is written to terminate at an underflow proc unless certain jump instructions are modified as the program is running.

Figure 8:
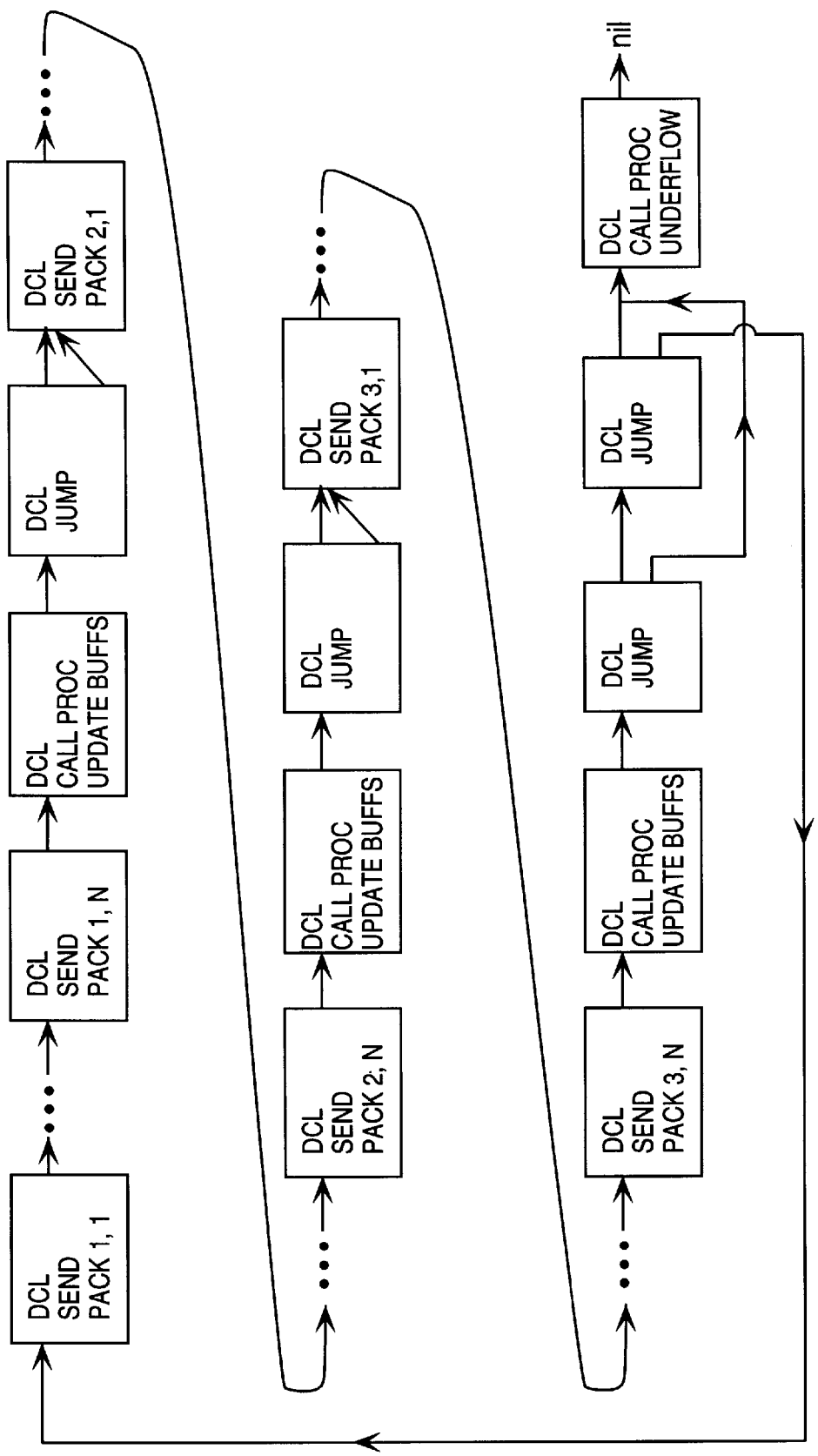
FIG. 8 illustrates one example of a DCL program which may utilize a ModifyDCLJump operation to control a data stream in a computer system according to one embodiment.

To further illustrate, as shown in FIG. 8, a driver has created a series of three frame transmission operations, each having a number of DCL send packet commands. At the end of each frame transmission operation is a DCL call proc command which notifies the driver that a frame of data has been sent and that the associated buffer should be updated with new data. After each set of frame transmission operations, the driver has placed a DCL jump command. So long as the buffer following a DCL jump command contains fresh data, the DCL jump command will simply jump to a DCL label (note, for clarity the label commands have not been shown in FIG. 8) before that buffer, allowing the associated data in the buffer to be passed to the data stream. However, if the buffer following a DCL jump command contains stale data (i.e., an underflow condition), the DCL jump command will jump to a DCL label before a DCL call proc command that will call an appropriate routine (Underflow) to notify the driver that its buffers have underflowed. Whenever the driver updates a buffer, it will call ModifyDClJump to set the DCL jump command before the updated buffer to point to a DCL label before the buffer.

The driver will then also call ModifyDClJump to set the DCL jump command after the updated buffer to point to a DCL label before the DCL call proc command that notifies the driver of buffer underflows. If the driver gets behind in updating the buffers and the DCL program progresses past the last updated buffer, the DCL program will jump to the DCL call proc command and notify the driver that its buffers have underflowed.

The above-described DCL is flexible and can easily support new opcodes for new commands. For example, in the prior art it is known to use a single buffer structure to transfer data between components of a computer system. For example, this structure may support data transfers between a CPU and a printer. While such a structure may work well in situations where a fixed packet size is always transmitted (and, hence, there is no need to modify the buffer structure), it does not work well for situations where packet size may vary (for example NTSC-formatted with video data). The DCL allows the fixed buffer structure to be supported by simply adding an opcode to support the desired structure and using the result as a new DCL command. In addition, other buffer sizes (i.e., buffer structures) can be supported by simply defining a new opcode. In this way, DCL can be tailored to suit the needs of the data transfer operation under consideration. Using translation and/or interpretation, backward compatibility is insured.

Thus a system and method for controlling data streams within a computer system has been described. In the foregoing specification, the invention has been described with reference to specific exemplary embodiments thereof. It will, however, be appreciated by those skilled in the art that various modifications and changes may be made thereto without departing from the broader spirit and scope of the invention as set forth in the appended claims. The specification and drawings are accordingly, to be regarded in an illustrative rather than a restrictive sense.

What is claimed is:

1. A method of controlling a data stream in a computer system, comprising the steps of:

combining a series of data stream commands at least some of which are capable of controlling aspects of data flow of one or more of a plurality of data items associated with a data stream to be transmitted over an isochronous channel within said computer system between at least one sender client and at least one listener client associated with said isochronous channel, into a nil terminated linked list to form a data stream control procedure;

assigning said data stream control procedure to said data stream; and managing said of data items associated with said data stream within said computer system by executing operations on said data items according to said data stream control procedure, said data items comprising packets configured in accordance with the IEEE 1394 Serial Bus Standard.

2. A method as in claim 1 wherein said step of managing comprises the steps of:

compiling said data stream control procedure into a sequence of direct memory access (DMA) commands; and executing said DMA commands by transferring said data items within a memory system associated with said computer system.

3. A method as in claim 2 wherein said step of compiling comprises determining whether a first data stream command in said data stream control procedure can be compiled and, if so, compiling said first data stream command into an associated first DMA command, otherwise translating said first data stream command into a second data stream command capable of being compiled and compiling said second data stream command into an associated second DMA command.

4. A method as in claim 2 wherein said data stream commands are compiled in a linear sequence.

5. A method as in claim 4 wherein said data stream control procedure includes a label command, said label command acting as a link to a subsequent data stream command in said data stream control procedure.

6. A method as in claim 4 wherein said data stream control procedure includes a modify jump command, said modify jump command capable of altering the sequence in which said operations on said data items are executed.

7. A computer system, comprising:

a plurality of nodes;

a plurality of point-to-point links interconnecting each of said nodes such that each of said point-to-point links connects one of said nodes to another of said nodes, wherein at least one of said nodes is configured to:

combine a series of data stream commands at least some of which are capable of controlling aspects of data flow of one or more of a plurality of data items associated with a data stream to be transmitted over an isochronous channel within said computer system between at least one sender client and at least one listener client associated with said isochronous channel, into a nil terminated linked list to form a data stream control procedure;

assign said data stream control procedure to said data stream; and manage said data items associated with said data stream within said computer system by executing operations on said data items according to said data stream control procedure, said data items comprising packets configured in accordance with the IEEE 1394 Serial Bus Standard.

8. A computer system as in claim 7 wherein said at least one node is further configured to:

compile said data stream control procedure into a sequence of direct memory access (DMA) commands; and execute said DMA commands by transferring said data items within a memory system associated with said computer system.

9. A computer system as in claim 8 wherein said at least one node is further configured to compile said data stream commands within said data stream control procedure in a linear sequence.

10. A computer readable medium having stored thereon a plurality of sequences of instructions, said plurality of sequences of instructions including sequences of instructions which, when executed by a computer system including a plurality of nodes interconnected by a plurality of point-to-point links, cause one of said nodes to perform the steps of:

combining a series of data stream commands at least some of which are capable of controlling aspects of data flow of one or more of a plurality of data items associated with a data stream to be transmitted over an isochronous channel within said computer system between at least one sender client and at least one listener client associated with said isochronous channel, into a nil terminated linked list to form a data stream control procedure;

assigning said data stream control procedure to said data stream; and managing said data items associated with said data stream within said computer system by executing operations on said data items according to said data stream control procedure, said data items comprising packets configured in accordance with the IEEE 1394 Serial Bus Standard.

11. A computer readable medium as in claim 10 having further stored thereon a plurality of sequences of instructions which, when executed by said computer system, cause said node to perform the further steps of:

compiling said data stream control procedure into a sequence of direct memory access (DMA) commands; and executing said DMA commands by transferring said data items within a memory system associated with said computer system.

12. A computer readable medium as in claim 11 wherein said plurality of sequences of instructions, when executed by said computer system, cause said node to compile said data stream commands in said data stream control procedure in a linear sequence.

13. A computer readable medium as in claim 11 wherein said data stream control procedure includes a label command which acts as a link subsequent data stream command in said data stream control procedure when said computer system executes said instructions.

14. A computer readable medium as in claim 11 wherein said data stream control procedure includes a modify jump command which, when executed by said computer system as part of said plurality of sequences of instructions, causes said node to alter the sequence in which said operations on said data items are executed.

15. A computer readable medium as in claim 11 wherein said data stream control procedure includes a command having an opcode field defining one of a plurality of data structures which, when executed by said computer system as part of said plurality of sequences of instructions, causes said node to execute associated operations on said data items.

16. A computer readable medium as in claim 11 wherein said data stream control procedure includes a command having an opcode which, when executed by said computer system as part of said plurality of sequences of instructions, is translated to one of a minimum set of opcodes supported by said node such that said node is able to perform said operations on said data items.

17. A computer readable medium as in claim 11 wherein said data stream control procedure includes a command having an opcode which, when executed by said computer system as part of said plurality of sequences of instructions, is interpreted using a minimum set of opcodes supported by said node such that said node is able to perform said operations on said data items.

* * * * *